United States Patent
Shaw

(10) Patent No.: US 7,201,248 B1
(45) Date of Patent: Apr. 10, 2007

(54) USER-CONTROLLABLE VEHICLE SAFETY BELT RELEASE SYSTEM

(76) Inventor: Gladys L. Shaw, 17422 Bradford St., Detroit, MI (US) 48205

( * ) Notice: Subject to any disclaimer, the term of this patent is extended or adjusted under 35 U.S.C. 154(b) by 447 days.

(21) Appl. No.: 10/803,354

(22) Filed: Mar. 19, 2004

(51) Int. Cl.
*B60R 22/00* (2006.01)

(52) U.S. Cl. .................... 180/268; 280/801.1

(58) Field of Classification Search .......... 180/268, 180/271, 281, 286; 280/801.1; 307/10.1; 340/438, 457.1
See application file for complete search history.

(56) References Cited

U.S. PATENT DOCUMENTS

| | | | |
|---|---|---|---|
| 3,168,158 A * | 2/1965 | Schoeffler et al. .......... | 180/270 |
| 3,963,090 A | 6/1976 | Hollins | |
| 4,300,789 A * | 11/1981 | Matsuoka et al. ....... | 280/801.1 |
| 4,432,119 A | 2/1984 | Schwark et al. | |
| 4,553,625 A | 11/1985 | Tsuge et al. | |
| 4,574,911 A | 3/1986 | North | |
| 4,815,177 A * | 3/1989 | MacKew ................. | 24/602 |
| 4,920,619 A | 5/1990 | Bender et al. | |
| 5,121,527 A | 6/1992 | Righi | |
| 5,123,498 A * | 6/1992 | Alcidi et al. ............. | 180/268 |
| 5,165,498 A * | 11/1992 | Garboli et al. ........... | 180/268 |
| 5,181,738 A * | 1/1993 | Shimizu ................... | 280/801.1 |
| 5,765,660 A * | 6/1998 | Ambrosi .................. | 180/268 |
| 6,123,166 A | 9/2000 | Verellen | |
| 6,428,049 B1 * | 8/2002 | Nichols ................... | 280/801.1 |
| 6,540,040 B1 * | 4/2003 | Patel ....................... | 180/269 |
| 2002/0023797 A1 * | 2/2002 | Baca ........................ | 180/271 |

FOREIGN PATENT DOCUMENTS

| | | | |
|---|---|---|---|
| CH | 615591 A5 * | 2/1980 | |
| DE | 4019402 A1 * | 12/1991 | |
| EP | 412942 A1 * | 2/1991 | |
| EP | 450441 A2 * | 10/1991 | |
| FR | 2598989 A3 * | 11/1987 | |
| FR | 2665675 A1 * | 2/1992 | |
| FR | 2683197 A1 * | 5/1993 | |
| FR | 2690661 A1 * | 11/1993 | |
| GB | 2020726 A * | 11/1979 | |
| JP | 03231054 A * | 10/1991 | |
| JP | 06219240 A * | 8/1994 | |

* cited by examiner

*Primary Examiner*—Paul N. Dickson
*Assistant Examiner*—Laura B. Freedman

(57) ABSTRACT

A safety belt release system includes an electronic control box, a master control button, a plurality of safety belt release buttons electrically connected to the control box, a power source, and a mechanism for releasing a safety belt. The releasing mechanism includes a plurality of safety belt latches having top and bottom portions electrically connected to the plurality of safety belt release buttons. The electronic control box receives a plurality of input signals respectively and sends a plurality of corresponding output signals to the safety belt releasing mechanism to thereby cause the ejection of a safety belt latch from a safety belt buckle independently of actuating a corresponding manual release mechanism of a safety belt.

12 Claims, 3 Drawing Sheets

USER-CONTROLLABLE VEHICLE SAFETY BELT RELEASE SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to vehicle safety belt release systems and, more particularly, to a user-controllable vehicle safety belt release system.

2. Prior Art

In accordance with federal safety regulations, every motor vehicle manufacturer in the United States now includes seat belt units. Usually each seat belt unit includes two seat belts. Attached to the end of one seat belt is a latching tongue. Attached to the end of the other seat belt is a tongue latching mechanism which includes a latch that the latching tongue can be locked onto.

A common fear that many persons have with using seat belts is that if they are involved in an accident they will not be able to release the seat belt latching tongue from the seat belt tongue latching mechanism so as to remove oneself, or be removed by other persons, from the motor vehicle. As an example, if a person wearing a seat belt is injured and the push button release for his seat belt buckle tongue latching mechanism is facing towards his body (if the seat belt becomes twisted), it is difficult for a rescuer to gain access to the seat belt buckle push button to release the latching tongue from the tongue latching mechanism so the person can be removed from the motor vehicle. It is not feasible for a rescuer to sever the seat belt straps unless a knife or cutting instrument is available.

Accordingly, a need remains for a user controllable vehicle safety belt release system that enables a user to manually and automatically release one or all safety belts in a vehicle.

BRIEF SUMMARY OF THE INVENTION

In view of the foregoing background, it is therefore an object of the present invention to provide an apparatus for automatically or manually releasing jammed safety belts. These and other objects, features, and advantages of the invention are provided by a safety belt release system for automatically releasing jammed safety belts including manual release mechanisms and an electronic control box connected to a vehicle electrical system.

The system further includes a master control button electrically connected to the control box for toggling the system between active and inactive modes so that the control box becomes responsive and unresponsive to signals generated by the system respectively. A plurality of safety belt release buttons having top and bottom portions are electrically connected to the control box. The top portion is integral therewith for being selectively toggled between raised and lowered positions by a user.

The system further includes a power source and a mechanism for releasing a safety belt and is selectively controllable by the plurality of safety belt release buttons when the master control button is at an active position. The electronic control box is electrically connected to the power source and a vehicle electrical system.

The releasing mechanism includes a plurality of safety belt latches having top and bottom portions electrically connected to the plurality of safety belt release buttons. The bottom portion has upper and lower portions and opposed side portions extending along a length of the upper and lower portions for forming a slot therebetween and for engaging a safety belt therein. The bottom portion is disengaged from the safety belt when a corresponding one of the plurality of safety belt release buttons is activated.

The electronic control box receives a plurality of input signals respectively and sends a plurality of corresponding output signals to the safety belt releasing mechanism to thereby cause the ejection of a safety belt latch from a safety belt buckle independently of actuating a corresponding manual release mechanism of a safety belt. The plurality of safety belt release buttons are connected in series to the control box so that the releasing means can independently activate and deactivate a plurality of vehicle safety belt release mechanisms as desired by a user.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

Figure 1:
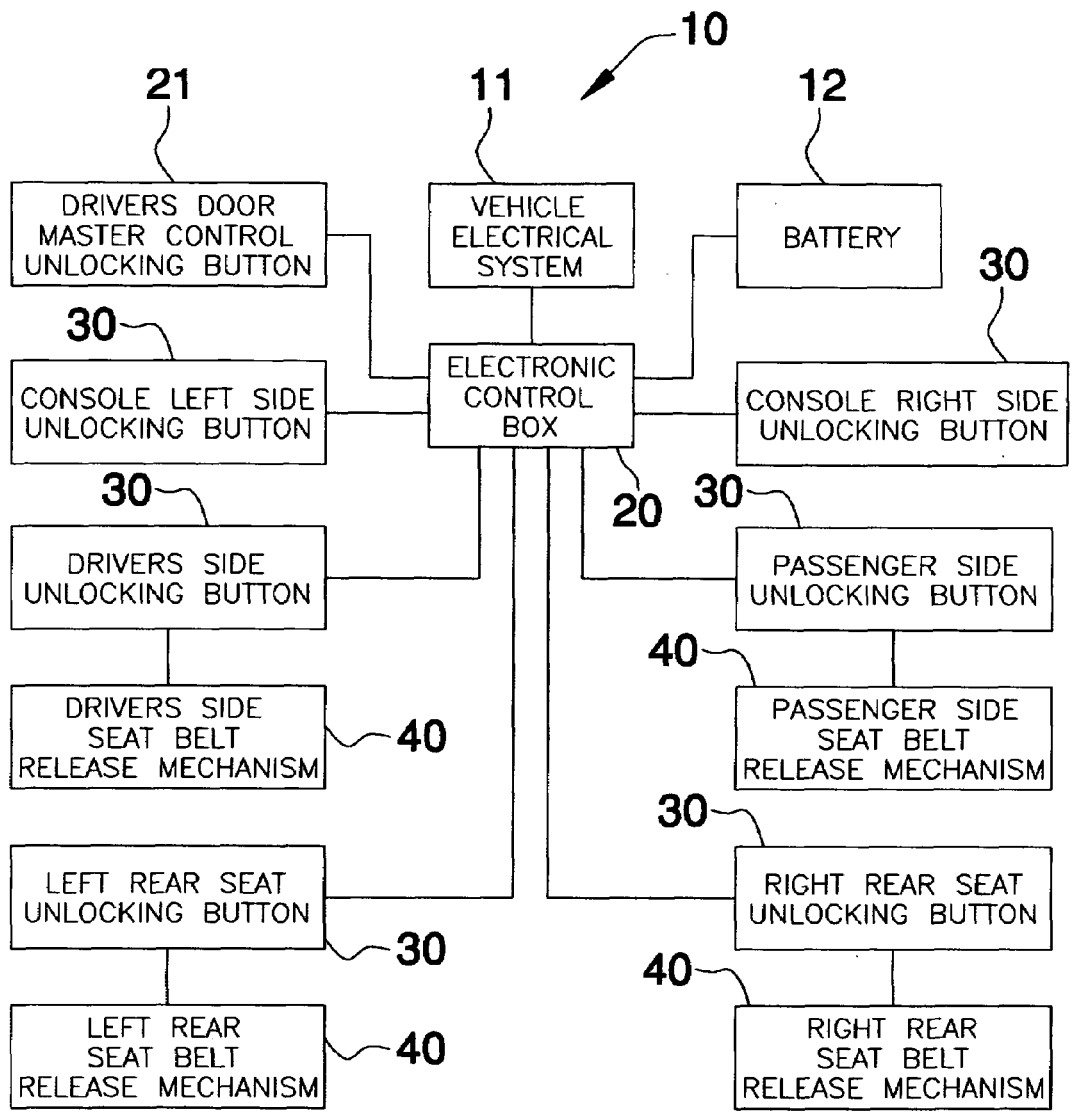
FIG. 1 is a schematic diagram of a user-controllable vehicle safety belt release system, in accordance with the present invention.
Figure 2:
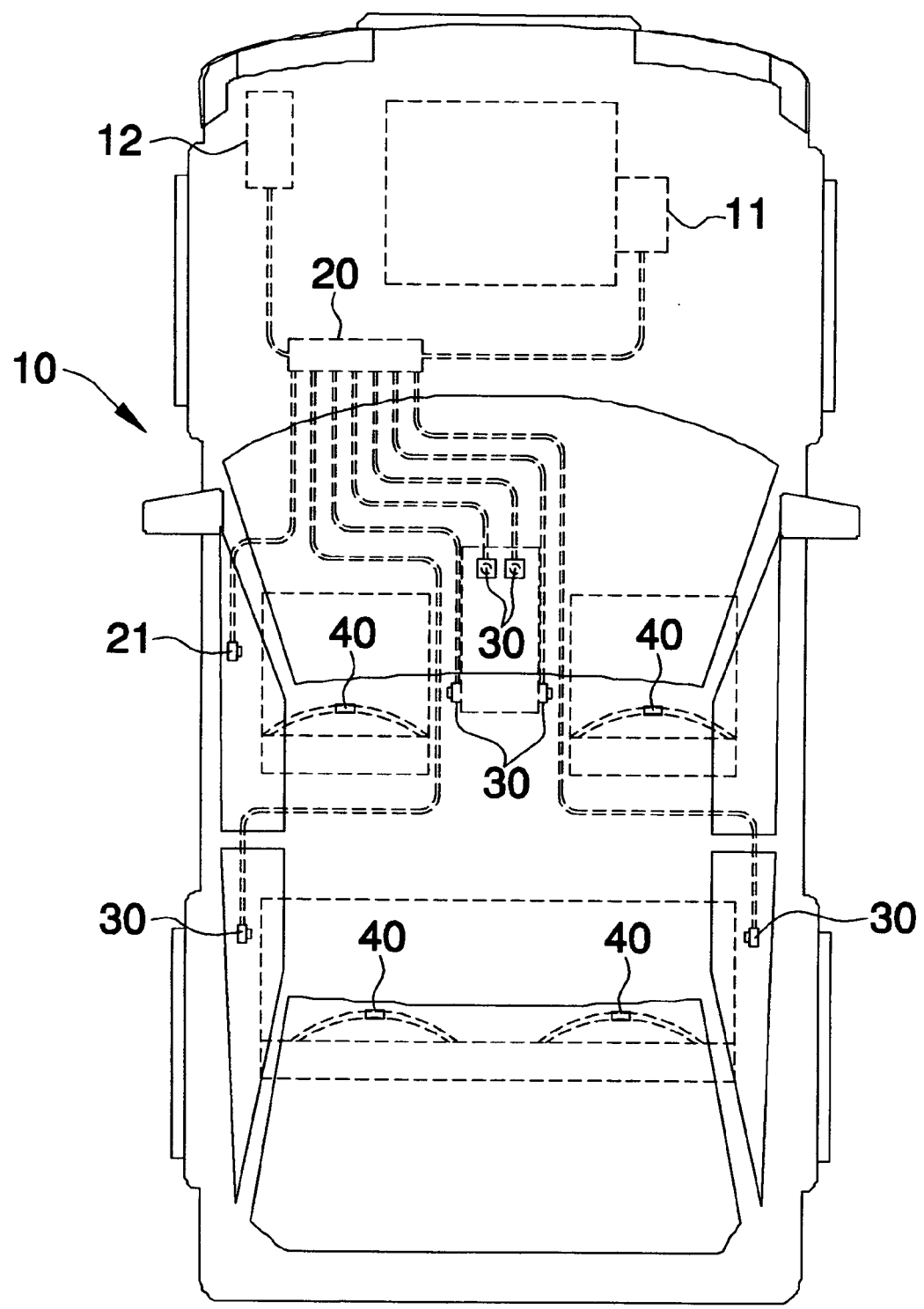
FIG. 2 is a top plan view of the present invention shown in a preferred environment.
Figure 3:
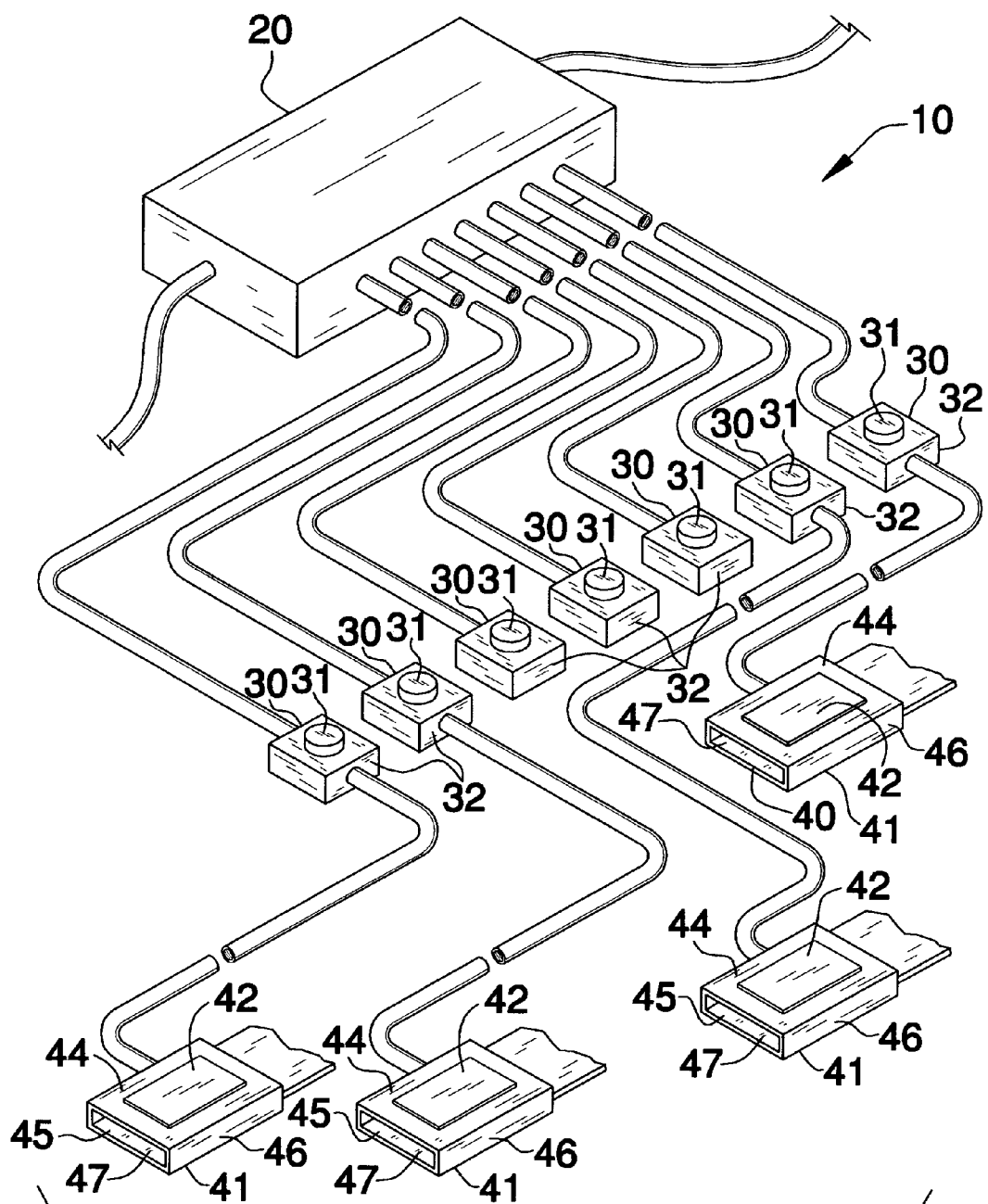
FIG. 3 is a perspective view of the present invention.

The apparatus of this invention is referred to generally in FIGS. 1–3 by the reference numeral 10 and is intended to provide a safety belt release system for automatically releasing jammed safety belts including manual release mechanisms. It should be understood that the system 10 may be used to release many different types of safety belts and should not be limited to only passenger car safety belts.

Initially referring to FIGS. 1 and 3, the system 10 includes an electronic control box 20 connected to a vehicle electrical system and a master control button 21 electrically connected to the control box 20 for toggling the system 10 between active and inactive modes so that the control box 20 becomes responsive and unresponsive to signals generated by the system 10 respectively. Advantageously, the master control button 21 allows a user to simultaneously release all safety belts within the vehicle in the event other passengers are unable to do so.

Now referring to FIG. 3, a plurality of safety belt release buttons 30 having top 31 and bottom 32 portions are electrically connected to the control box 20. The top portion 31 is integral therewith for being selectively toggled between raised and lowered positions by a user. This allows a user to manually release his/her safety belt in the event of an accident or emergency.

Referring back to FIGS. 1 and 3, the system 10 further includes a power source 12 and a mechanism 40 for releasing a safety belt selectively controllable by the plurality of safety belt release buttons 30 when the master control button 21 is at an active position. The electronic control box 20 is electrically connected to the power source 12 and a vehicle electrical system, and thus, is operable whether a vehicle's motor is operating. This is especially useful if a vehicle catches fire, is sinking in a body of water, or experiencing some other similar non-operating condition.

Now referring to FIG. 3, the releasing mechanism 40 includes a plurality of safety belt latches 41 having top 42 and bottom 43 portions electrically connected to the plurality of safety belt release buttons 30. The bottom portion 43 has upper 44 and lower 45 portions and opposed side portions 46, 47 extending along a length of the upper 44 and lower 45 portions for forming a slot 48 therebetween and for engaging a safety belt therein. The design of the safety belt latches 41 enables the system 10 to be retrofitted into existing vehicles as well as new production models. The bottom portion 43 is disengaged from the safety belt when a corresponding one of the plurality of safety belt release buttons 30 is activated.

The electronic control box 20 receives a plurality of input signals respectively and sends a plurality of corresponding output signals to the safety belt releasing mechanism 40 to thereby cause the ejection of a safety belt latch 41 from a safety belt buckle independently of actuating a corresponding manual release mechanism 40 of a safety belt. The plurality of safety belt release buttons 30 are connected in series to the control box 20 so that the releasing mechanism 40 can independently activate and deactivate a plurality of vehicle safety belt release mechanisms as desired by a user.

The system 10 is easy to use and gives motorists peace of mind. Instead of being unable to release a jammed or malfunctioning safety belt, a user simply activates the system 10 to release the buckle. This enhances motor vehicle safety and could mean the difference between life and death if a fire erupts or a person needs emergency medical assistance. Because the system 10 prevents panic and eliminates the frustration of jammed safety belts, more motorists could be prompted to wear their safety belts on a regular basis, thereby enhancing travel safety and reducing overall insurance costs.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A safety belt release system for automatically releasing jammed safety belts including manual release mechanisms, said system comprising:

an electronic control box connected to a vehicle electrical system;

a master control button electrically connected to said control box and for toggling said system between active and inactive modes so that said control box becomes responsive and unresponsive to signals generated by said system respectively;

a plurality of safety belt release buttons electrically connected to said control box, said release buttons having top and bottom portions, said top portion being integral therewith and for being selectively toggled between raised and lowered positions by a user;

means for releasing a safety belt and being selectively controllable by said plurality of safety belt release buttons when said master control button is at an active position; and a power source;

said electronic control box for receiving a plurality of input signals respectively and for sending a plurality of corresponding output signals to said safety belt releasing means to thereby cause the ejection of a safety belt latch from a safety belt buckle independently of actuating a corresponding manual release mechanism of a safety belt.

2. The safety belt release system of claim 1, wherein said releasing means comprises: a plurality of safety belt latches electrically connected to said plurality of safety belt release buttons, said latches having top and bottom portions, said bottom portion having upper and lower portions and opposed side portions extending along a length of said upper and lower portions for forming a slot therebetween and for engaging a safety belt therein, said bottom portion being disengaged from said a safety belt when a corresponding one of said plurality of safety belt release buttons is activated.

3. The safety belt release system of claim 1, wherein said plurality of safety belt release buttons are connected in series to said control box so that said releasing means can independently activate and deactivate a plurality of vehicle safety belt release mechanisms as desired by a user.

4. The safety belt release system of claim 1, wherein said electronic control box is electrically connected to said power source.

5. The safety belt release system of claim 1, wherein said electronic control box is electrically connected to a vehicle electrical system.

6. A safety belt release system for automatically releasing jammed safety belts including manual release mechanisms, said system comprising:

an electronic control box connected to a vehicle electrical system;

a master control button electrically connected to said control box and for toggling said system between active and inactive modes so that said control box becomes responsive and unresponsive to signals generated by said system respectively;

a plurality of safety belt release buttons electrically connected to said control box, said release buttons having top and bottom portions, said top portion being integral therewith and for being selectively toggled between raised and lowered positions by a user;

means for releasing a safety belt and being selectively controllable by said plurality of safety belt release buttons when said master control button is at an active position, said plurality of safety belt release buttons are connected in series to said control box so that said releasing means can independently activate and deactivate a plurality of vehicle safety belt release mechanisms as desired by a user; and a power source;

said electronic control box for receiving a plurality of input signals respectively and for sending a plurality of corresponding output signals to said safety belt releasing means to thereby cause the ejection of a safety belt latch from a safety belt buckle independently of actuating a corresponding manual release mechanism of a safety belt.

7. The safety belt release system of claim 6, wherein said releasing means comprises: a plurality of safety belt latches electrically connected to said plurality of safety belt release buttons, said latches having top and bottom portions, said bottom portion having upper and lower portions and opposed side portions extending along a length of said upper and lower portions for forming a slot therebetween and for engaging a safety belt therein, said bottom portion being disengaged from said a safety belt when a corresponding one of said plurality of safety belt release buttons is activated.

8. The safety belt release system of claim 6, wherein said electronic control box is electrically connected to said power source.

9. The safety belt release system of claim 6, wherein said electronic control box is electrically connected to a vehicle electrical system.

10. A safety belt release system for automatically releasing jammed safety belts including manual release mechanisms, said system comprising:

an electronic control box connected to a vehicle electrical system, said electronic control box further being electrically connected to a vehicle electrical system;

a master control button electrically connected to said control box and for toggling said system between active and inactive modes so that said control box becomes responsive and unresponsive to signals generated by said system respectively;

a plurality of safety belt release buttons electrically connected to said control box, said release buttons having top and bottom portions, said top portion being integral therewith and for being selectively toggled between raised and lowered positions by a user;

means for releasing a safety belt and being selectively controllable by said plurality of safety belt release buttons when said master control button is at an active position, said plurality of safety belt release buttons are connected in series to said control box so that said releasing means can independently activate and deactivate a plurality of vehicle safety belt release mechanisms as desired by a user; and a power source;

said electronic control box for receiving a plurality of input signals respectively and for sending a plurality of corresponding output signals to said safety belt releasing means to thereby cause the ejection of a safety belt latch from a safety belt buckle independently of actuating a corresponding manual release mechanism of a safety belt.

11. The safety belt release system of claim 10, wherein said releasing means comprises; a plurality of safety belt latches electrically connected to said plurality of safety belt release buttons, said latches having top and bottom portions, said bottom portion having upper and lower portions and opposed side portions extending along a length of said upper and lower portions for forming a slot therebetween and for engaging a safety belt therein, said bottom portion being disengaged from said a safety belt when a corresponding one of said plurality of safety belt release buttons is activated.

12. The safety belt release system of claim 10, wherein said electronic control box is electrically connected to said power source.

* * * * *